United States Patent [19]

Togashi

[11] Patent Number: 4,635,127
[45] Date of Patent: Jan. 6, 1987

[54] DRIVE METHOD FOR ACTIVE MATRIX DISPLAY DEVICE

[75] Inventor: Seigo Togashi, Tokorozawa, Japan

[73] Assignee: Citizen Watch Company Limited, Tokyo, Japan

[21] Appl. No.: 562,674

[22] Filed: Dec. 19, 1983

[30] Foreign Application Priority Data

Dec. 21, 1982 [JP] Japan ............................. 57-222925

[51] Int. Cl.[4] .................................................. H04N 5/70
[52] U.S. Cl. ..................................... 358/236; 358/230; 358/241
[58] Field of Search ............... 358/236, 241, 213, 148, 358/230; 340/784

[56] References Cited

U.S. PATENT DOCUMENTS 4,368,523  1/1983  Kawate ............................. 358/236
4,455,576  6/1984  Hoshi ............................... 358/236

OTHER PUBLICATIONS

A Crystal-Crystal TV Display Panel using a MOS Array with Gate-Bus Drivers, by K. Kasahara, et al., 1980 Biennial Display Research Conference, Conference Record, Cherry Hill, N.J., USA, Oct. 21–23, 1980, pp. 96–101.

Primary Examiner—Tommy P. Chin
Attorney, Agent, or Firm—Jordan and Hamburg

[57] ABSTRACT

A method of driving an "active matrix" display device which is driven by scanning signals to sequentially store and display image signal data by successive rows of picture elements, incorporating for example liquid crystal display elements, whereby the image signal data applied to successive picture element rows (or successive groups of rows) is alternately inverted in polarity about a fixed reference potential. Image-dependent leakage current effects caused by non-ideal characteristics of the matrix switching elements are thereby effectively reduced due to the elimination of low-frequency components other than the reference potential from the image signals applied to each column of display elements.

17 Claims, 18 Drawing Figures

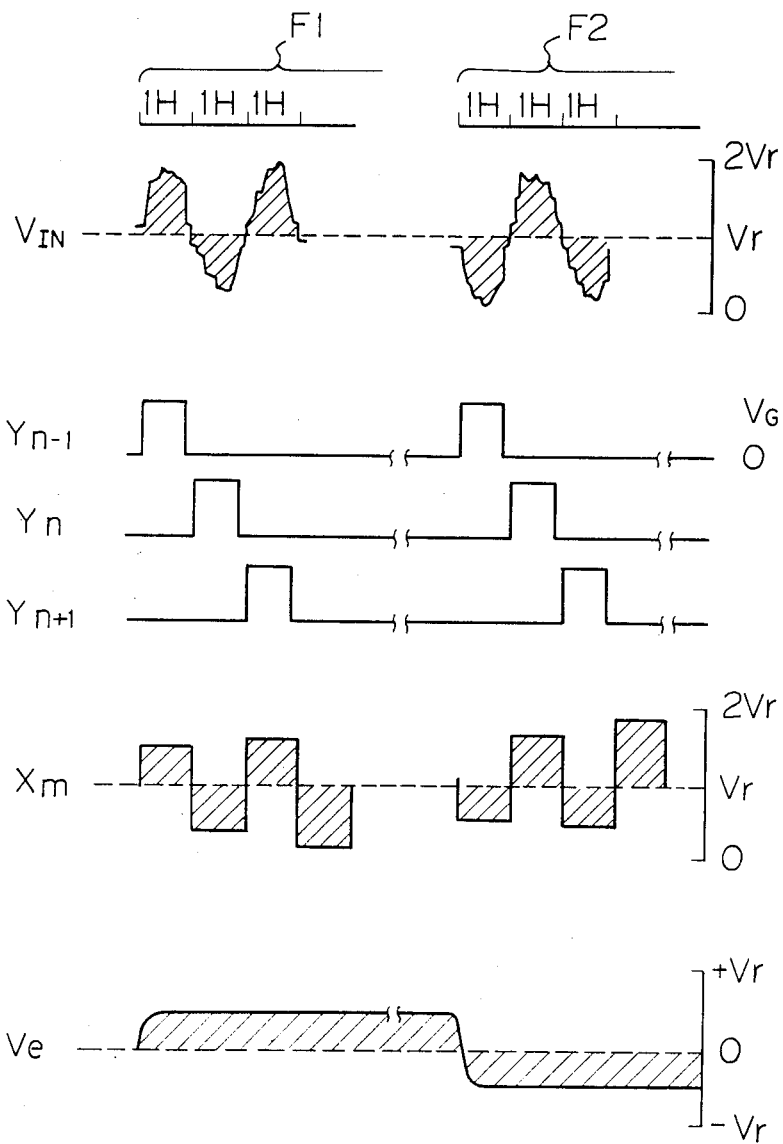

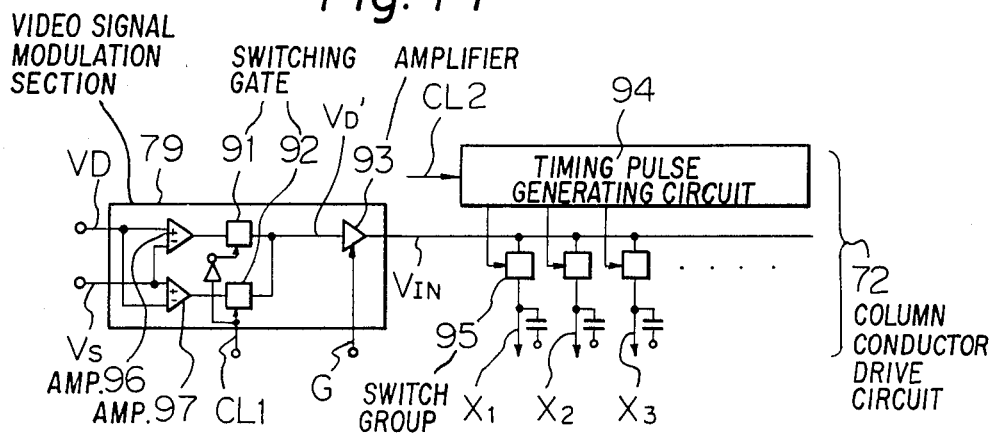
Fig. 14
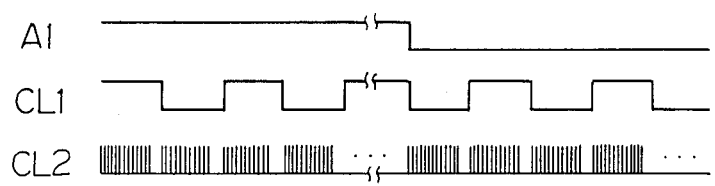
Fig. 15
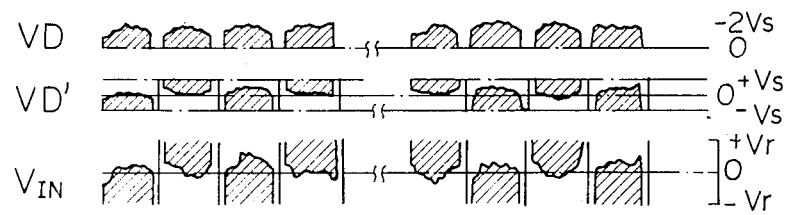

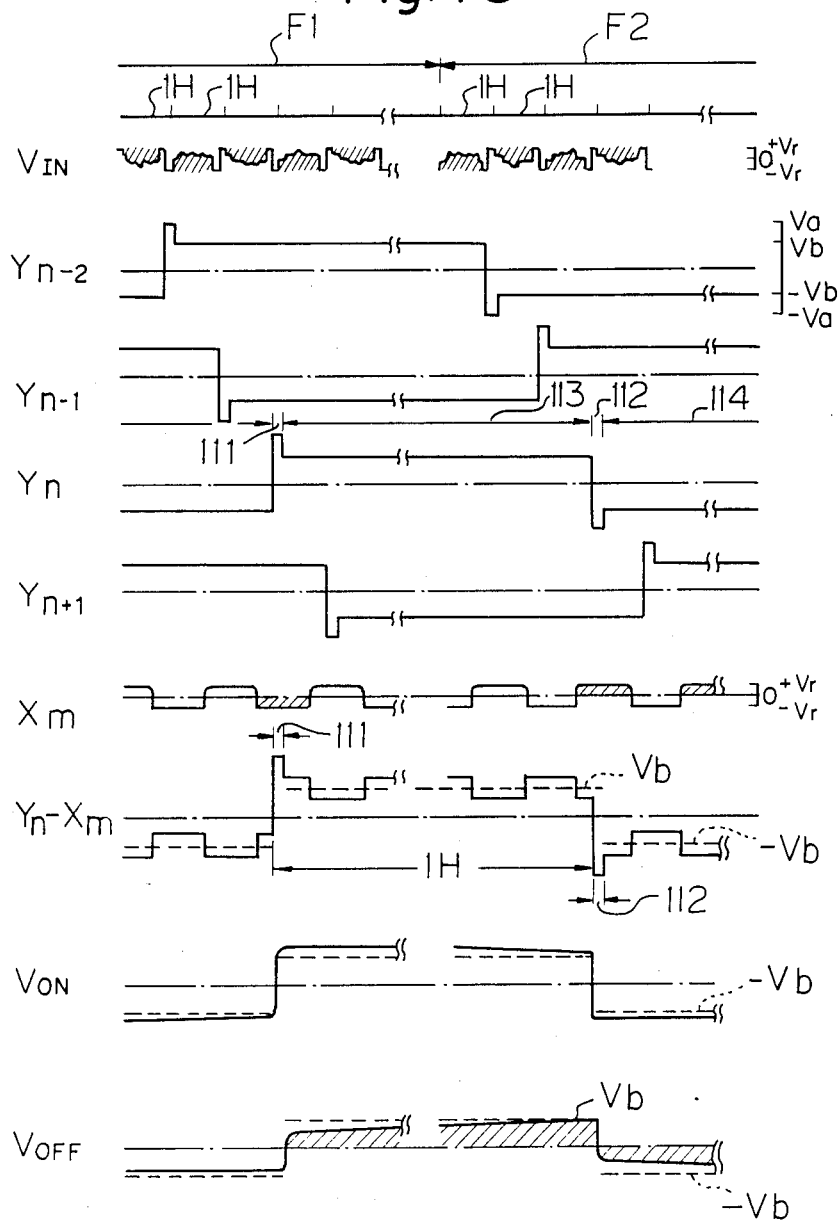

DRIVE METHOD FOR ACTIVE MATRIX DISPLAY DEVICE

BACKGROUND OF THE INVENTION

The present invention relates to a method of driving a planar display device of the so-called "active matrix" type, i.e. a display device comprising a set of row conductors and a set of column conductors, and an array of picture elements (pixels) each made up of a display element such as a liquid crystal display element coupled to a switching element such as a transistor, each picture element being disposed at an intersection of a row and a column conductor, and with each switching element acting to control the transfer of a video data signal to be stored as a charge in a capacitance coupled to the corresponding display element, with the amount of charge determining the optical state of that display element. This capacitance can be the self-capacitance of the display element, or an additional small capacitor coupled thereto. In particular, the present invention is directed towards a drive method for a display device which is employed for applications such as television image display, whereby successive rows of picture elements are sequentially scanned to be updated in accordance with the contents of a video signal, with all of the rows being scanned during a periodically repeated interval generally referred to as a field. That is to say, a complete image is generated by the display during each field.

Such active matrix display devices have not yet reached the stage of practical mass-production manufacture, although they possess significant advantages over simpler types of matrix display device (i.e. those which do not incorporate an individual switching element to control each display element in the matrix) with regard to achieving a high level of contrast even when the number of elements in the display is very large. The major factor which has prevented the practical application of such active matrix display devices lies in the manufacturing difficulties which result when it is attempted to provide switching elements in the display matrix which will have good electrical characteristics, i.e. which will have a low level of leakage current. Due to the very large number of these switching elements necessary in a matrix, and particularly in the case of a matrix having a very large number of picture elements such as is required for television display, and due to the fact that each switching element must generally be of very small size in order to avoid excessive reduction of the effective display area, the manufacturing costs tend to be extremely high, and the manufacturing yield low. Non-linear resistance elements (generally referred to as NLREs) have been proposed for use as switching elements to enable low-cost active matrix display devices to be manufactured, due to the production process required for these being less complex than that for thin-film transistors used as switching elements. However such nlres result in higher levels of leakage current than do thin-film transistors, so that these have not so far been practically implemented into matrix display devices.

There is therefore an urgent requirement for some means of relaxing the requirements set upon the switching elements of such display devices and in particular for means to enable switching elements having a relatively high leakage current to be employed, both to enable simpler and more easily manufactured elements to be used and also to enable the manufacturing yield to be increased. This requirement is met by the drive method of the present invention.

SUMMARY OF THE DISCLOSURE

With the method of driving an active matrix type of display device according to the present invention, the video data signal is converted into a signal which periodically is inverted in polarity, with the intervals between these periodic inversions being relatively short by comparison with the time constant formed by the leakage resistance of the switching element and the holding capacitance of the display element forming a picture element. More specifically, assuming that the video data signal is applied to the column conductors of the display matrix, to be read sequentially into successive rows of display elements in response to row scanning signal pulses, the polarity of the video data signal will alternate (about a predetermined reference voltage) successively as successive rows (or sets of adjacent rows) are scanned by the row scanning signals. In this way, the low-frequency components of the video data signal are suppressed, and only high-frequency components containing the necessary video information are supplied to the display element. Since the magnitude of data-dependent leakage from the holding capacitances of the display elements is essentially determined by the low-frequency components in the video data signal, such leakage is effectively eliminated. Leakage from the display elements resulting from other factors, such as the effects of incident light acting on the switching elements, will remain unchanged. However such leakage affects the entire display matrix in a substantially uniform manner, and therefore can be readily compensated, as is described in detail in the following specification.

As a result, the method of the present invention permits switching elements to be utilized in such a display device which have much higher values of leakage current than has been permissible with prior art methods. Thus, practical manufacture of such active matrix displays is made possible, through the resulting ease of manufacture, enhanced manufacturing yield, and the ability to use simple elements such as non-linear resistance elements as switching elements in the matrix.

BRIEF DESCRIPTION OF THE DRAWINGS

FIG. 9 shows display drive signal waveforms for the embodiment of FIG. 5;

FIGS. 14 and 15 are a circuit diagram and waveform diagram respectively of a video modulation circuit and a column drive circuit for the embodiment of FIG. 11;

FIG. 18 is a waveform diagram showing drive signal waveforms for the embodiment of FIG. 11.

DESCRIPTION OF THE PREFERRED EMBODIMENTS

Figure 1:
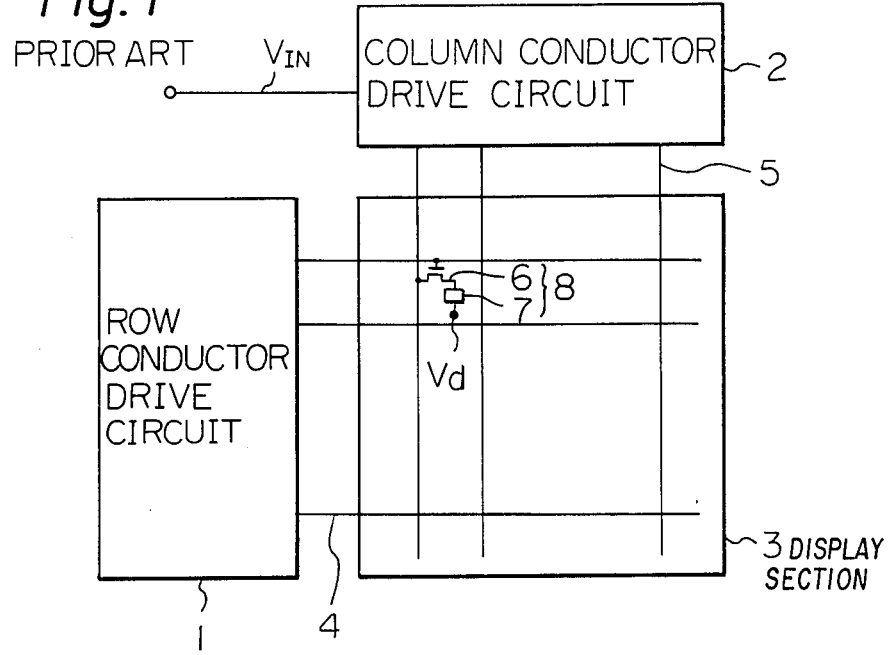
FIG. 1 is a block circuit diagram of an active matrix display utilizing a prior art drive method, in which transistors are employed as switching elements.

Before describing embodiments of the present invention, a description of the basic features of an active matrix display device according to the prior art will be given, referring to FIG. 1. In FIG. 1, a display section 3 comprises an array of row conductors 4 and column conductors 5, with a picture element 8 disposed at each intersection of these row conductors and column conductors, each picture element comprising a switching element 6 and a display element 7. Each display element comprises an element whose optical properties are electrically controlled, generally combined with a small amount of capacitance in which charge is stored, to thereby maintain a substantially fixed potential across the optical element in the intervals between successive applications of data signals thereto. For convenience of description it will be assumed that each switching element 6 comprises a transistor (e.g. a thin-film transistor) and each display element 7 is a liquid crystal element. However various other types of switching elements and display elements may be utilized in such an active matrix display device, e.g. electro-chromic, electro-luminescent or other types of display element may be employed. The control terminal (i.e. gate electrode) of each switching element 6 is connected to a corresponding one of the row conductors, and each switching element acts to selectively connect and disconnect one terminal of the corresponding display element to a specific one of column conductors 5 in accordance with control signals applied to that row conductor. The other terminal of each display element is connected to a fixed reference potential such as ground potential. Data signals (e.g. video data signals) output from a column conductor drive circuit in a time-sharing manner are applied to the column conductors, while timing signals referred to in the following as row scanning signals are produced from a row electrode drive circuit 1 which act to sequentially set the rows of switching elements 6 into the ON state, i.e. the state in which an switching element 6 connects the corresponding display element 7 to a column conductor 5. The timing of the operation of column conductor drive circuit 2 and row electrode drive circuit 1 are synchronized such that each row of switching elements is set in the ON state by a scanning signal from the row electrode drive circuit while data signals to be read into that row of display elements 7 is being output from the column conductor drive circuit 2.

Figure 2:
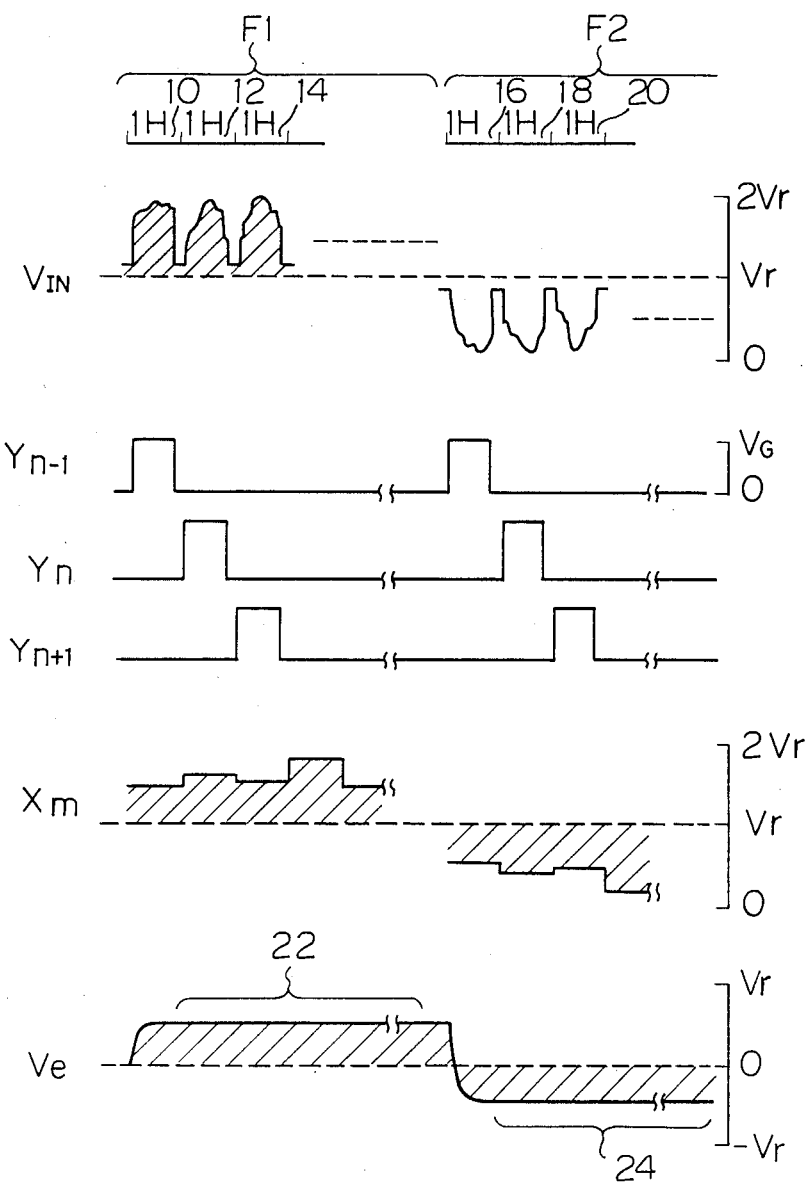
FIG. 2 shows the drive signal waveforms for the embodiment of FIG. 1.

FIG. 2 shows typical signal waveforms for a active matrix display device such as that of FIG. 1, for the case in which the display device is used to display a television image. F1 and F2 denote a first and a second field respectively, with scanning of all of the row conductors 4 being performed during each field. since this example is for liquid crystal display elements, the polarity of a video data signal Vin is inverted during successive fields, about a reference potential level Vr as a center value.

With such a active matrix display device for television, during each of the horizontal scanning intervals denoted by numerals 10 to 20, and collectively designated as 1H, portions of the video data signal which are to be read into a particular row of display elements are sequentially output from the column conductor drive circuit onto successive ones of the column conductors 5, and are temporarily held stored in the capacitance associated with each column conductor. Upon completion of output of all of the video signals for that row of display elements, (i.e. upon completion of that horizontal scanning interval), a row scanning signals pulse (e.g. as designated Yn−1, Yn, Yn+1, ... shown in FIG. 2) is applied to the corresponding row conductor, to thereby read the stored data signals from the column conductors into the display elements.

Signal Xm in FIG. 2 illustrates the typical form of the resultant signal waveform appearing on a column conductor. Signal Ve illustrates the waveform which will appear across a display element which is located at the intersection of a column conductor having data signal waveform Xm appearing thereon and the row conductor which has the row scanning signals Yn applied thereto. As shown, the potential appearing across the display element should remain constant during each field, with successively alternating polarity during successive fields as indicated by numerals 22 and 24.

Figure 3:
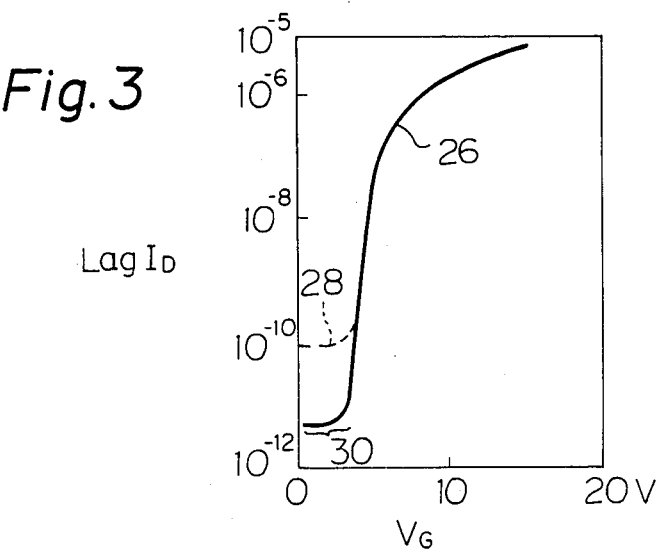
FIG. 3 shows typical characteristics of thin-film transistors used as switching elements in such a display matrix.

The above description assumes that the switching elements 6 are ideal, i.e. do not display significant levels of leakage current with respect to the durations of the scanning fields. However the characteristic of gate electrode voltage Vg versus drain current Id for a typical actual transistor switching element is shown in FIG. 3, for the case of an amorphous silicon thin-film transistor. This exhibits a leakage current as indicated, in the low Vg region 30, and if light is incident on the transistor then this leakage current increases substantially, e.g. as indicated by numeral 28. This leakage current acts to reduce the signal holding capabilities of a picture element which includes such a switching element, i.e. the leakage current will result in the stored capacitance charge described above being gradualy reduced during each scanning field. This problem is made even more serious by what is generally referred to as "data-dependent leakage", as described hereinafter. With such a phenomenon, the rate of leakage current is made dependent upon the display data applied to the display elements. That is to say, after a display element has been set to a particular data potential such as that of signal Ve in FIG. 2, then the rate of leakage through the switching element of that display element thereafter will be determined by the potential of the corresponding column conductor (i.e. of signal Xm in FIG. 2).

Figure 4:
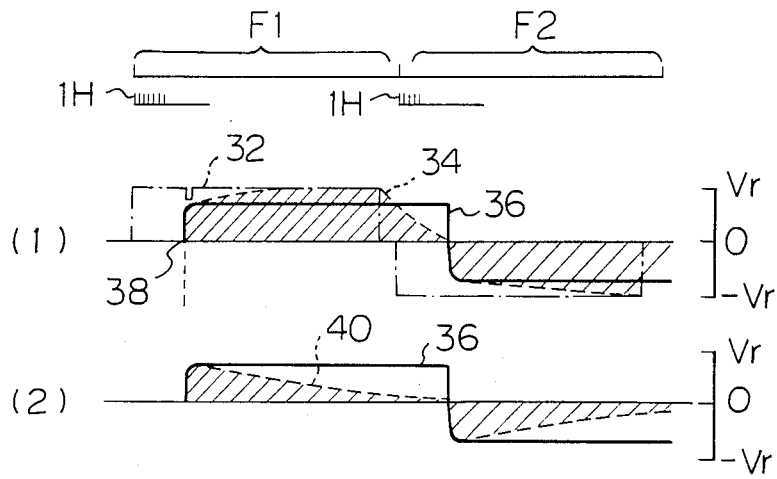
FIG. 4 shows waveforms to illustrate the effects of data-dependent leakage in the embodiment of FIG. 1.

This phenomenon will be explained with reference to FIG. 4. In FIG. 4(1), it is assumed that a particular display element has data read therein at a time point (indicated by numeral 38) during scanning field F1. Ideally, the potential stored in that display element should remain constant, as indicated by numeral 36, during the remainder of that field, and should then alternate in polarity. However if it is assumed that all of the other display elements of the column conductor corresponding to that display element have a higher value of data potential stored therein during that field (e.g. all of the other display elements are set into the ON, or maximum brightness state), then due to the leakage current of the switching element of the display element in question, the potential stored in that display element will gradually rise during field F1 as indicated by line 34. A similar effect will occur during the next field F2. Conversely, as shown in FIG. 4(2), if most of the other display elements of the column conductor corresponding to the display element in question should be set to store a low value of data potential during field F1 (e.g. are set into a minimum brightness state), then the potential stored in that display element will gradually decrease during the field, as indicated by numeral 40.

Thus it can be understood that since the amount of leakage current which flows through a switching element is determined by the potential difference between the level stored in the corresponding display element and the video data signal potentials applied to the corresponding column conductor after the display element contents have been updated during a scanning field, a type of data-dependent leakage or cross-talk effect occurs. This phenomenon greatly increases the stringency of the need for low leakage current levels in switching elements used in such active matrix display devices, and has been a major reason why it has not up till now been possible to utilize switching elements which can be economically manufactured by a simple production process, such as non-linear resistance elements. Furthermore, since the video data signals vary in an irregular manner, it is almost impossible to provide means for compensating this signal-dependent leakage effect.

The most generally used countermeasure against this effect has been to provide a sufficiently high level of signal storage capacitance in each display element such that even for the worst case leakage values, the picture quality will remain within acceptable limits, i.e. to attempt to ensure that a sufficiently low amount of change in potential of each display element will occur during each scanning field. However such a countermeasure results in increased manufacturing cost, reduced manufacturing yield, and a reduction of the effective display area of the matrix display device due to the increased amount of display area which must be occupied by the display element signal holding capacitors. there is also an increase in power consumption, due to the increased charging currents required by the signal holding capacitances, and an increased current drive capability required for the peripheral circuits.

With the drive method according to the present invention, this data-dependent leakage current effect is completely eliminated, and only leakage currents which affect the display in a uniformly distributed manner will be produced. As a result, the limits on the leakage current performance of the switching elements can be considerably relaxed, so that more easily manufactured devices can be used as switching elements, and manufacturing yield increased. In addition, a major cause of leakage current which affects the display uniformly, i.e. the effects of incident light, can be compensated in a simple and effective manner as will be described hereinafter, thereby further relaxing the limits on leakage current performance of the switching elements.

The method of the present invention will now be described in detail, referring to the drawings and first to FIG. 5. This is a block diagram of an embodiment of an active matrix display device employing the method of the present invention. The display section 3, column conductor drive circuit 2, row electrode drive circuit 1, can be identical to those of the prior art example of FIG. 1. Numeral 49 denotes a control circuit which includes a source of a video data signal Vd. Numeral 46 denotes a sync signal generating section, and numerals 44 and 50 denote a video signal modulation section and a leakage current sensing circuit respectively, which are unique to the method of the present invention.

Figure 8:
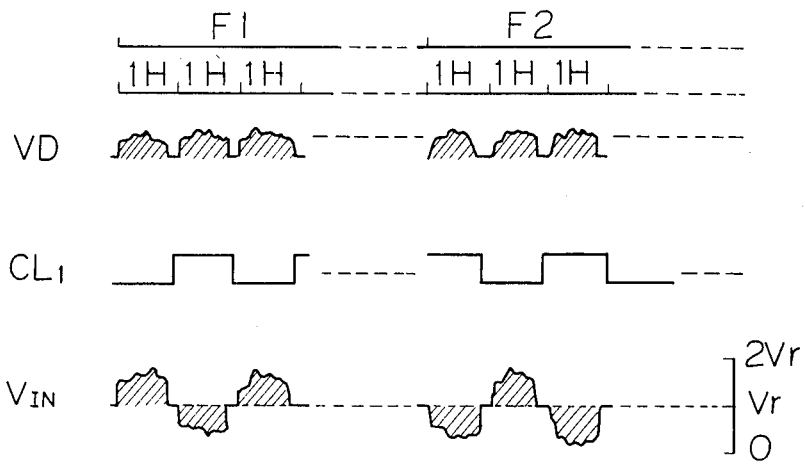
FIG. 8 shows signal waveforms for the circuit of FIG. 7.
Figure 10:
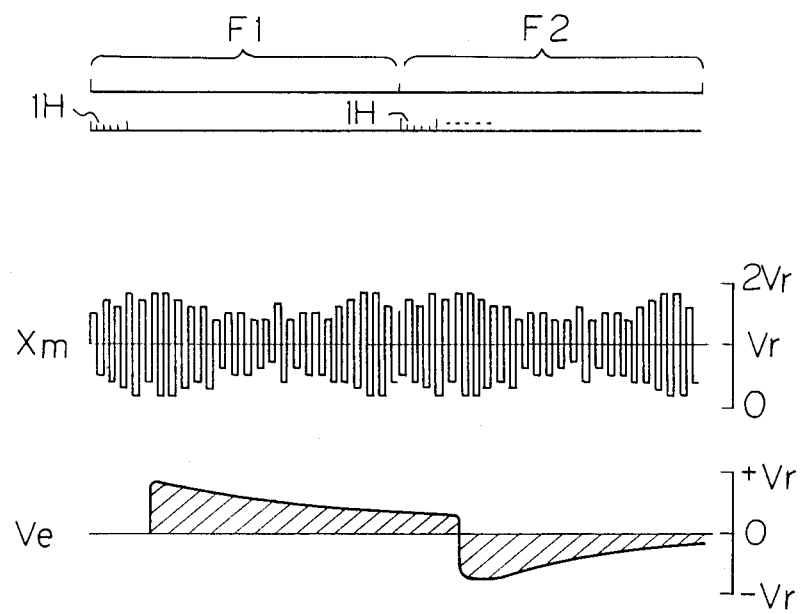
FIG. 10 shows waveforms for assistance in describing the decrease in data-dependent current leakage attained by the present invention.

FIGS. 8, 9 and 10 are waveform diagrams for assistance in describing the method of the present invention. As shown in FIG. 8, the polarity of video data signal $V_D$ is inverted successively about the reference potential level Vr during each horizontal scanning interval 1H by the video signal modulation section 44, to become signal Vin which is input to the column conductor drive circuit 2. FIG. 9 shows waveforms corresponding to the prior art example of FIG. 2. As shown, with this embodiment of the present invention, the polarity of the video data signal which is actually applied to the column conductors, i.e. signal Vin, is inverted during each successive horizontal scanning interval 1H. As a result, as the row scanning signals pulses Yn−1, Yn, Yn+1, ... etc sequentially scan the row conductors of a column of display elements, the polarity of the video signal which is stored in each display element of that column will be sequentially inverted for successive display elements of the column. Such a successively alternating signal appearing on a column conductor is illustrated by waveform Xm in FIG. 9. Thus, the video data signal applied to a display element in the row which is updated by row scanning signals pulse Yn−1 is positive with respect to the reference potential Vr during field F1, while that applied to the display element in the same column and in the next row, which is updated by row scanning signals pulse Yn, is negative with respect to Vr, and the video data signal polarity applied to the next display element of that column (at timing Yn+1) is again positive, ... and so on.

It can be further understood that the polarity of the video data signal applied to each row of display elements is inverted for each successive scanning field, e.g. the video signal portion Xm corresponding to row scanning signals pulse Yn−1 in FIG. 9 is of positive polarity in frame F1, and is of negative polarity during the next field F2. In this way, the requirement for applying an alternating voltage to the liquid crystal elements, with no DC component, is met by the drive method of the present invention.

The video data signal potential Ve which is stored by any display element is of the same form as in prior art example described above, i.e. this potential should ideally remain constant during the 1-field intervals between each row scanning signals pulse.

In this way, all of the low-frequency components of the video data signal applied to any column conductor, other than the reference potential value Vr are completely removed, and only the high-frequency components necessary for conveying the video information are transferred to the column conductor. Thus, the possibility of occurrence of the worst-case condition described hereinabove, where the video data signal potential stored in a display element is substantially different in magnitude from the potentials which subsequently appear upon the column conductor of that display element during a scanning field, is made virtually negligible.

This is due to the fact that the potential of the video data signal (i.e. the absolute value of that potential) applied to a column conductor will almost always change in a relatively gradual manner during each scanning field, i.e. the potential difference between the video data signal levels applied to display elements of the same column situated in adjacent rows is generally small. Thus, by performing successive inversion of the polarity of the video data signal as successive rows are scanned, the data-dependent leakage current effect described above is almost entirely eliminated. More specifically, the time constant formed by the leakage resistance of a switching element and the signal holding capacitance of a display element is substantially longer than the duration of a horizontal scanning interval 1H, so that the amount of leakage through the switching elements is almost entirely determined by the low-frequency components of the video data signal, i.e. the components which are eliminated by the drive method of the present invention.

FIG. 10 illustrates the signal waveforms during two successive fields for a display device using the method of the present invention. As will be apparent, the video data signal Xm applied to a column conductor contains only high-frequency components, varying about the reference potential Vr as a center value. The form of the potential appearing across a display element, shown as signal Ve, will always fall from an initial value (established when a row scanning signals pulse is applied to the switching element of that display element) towards zero. This shape of the display element potential waveform is independent of the video data applied to the column conductor of that display element to drive other display elements, i.e. effective potential appearing on a display element (the rms value) during each field is non data-dependent. Thus the problem of data dependent leakage which occurs with prior art drive methods as described above is completely eliminated.

Figure 5:
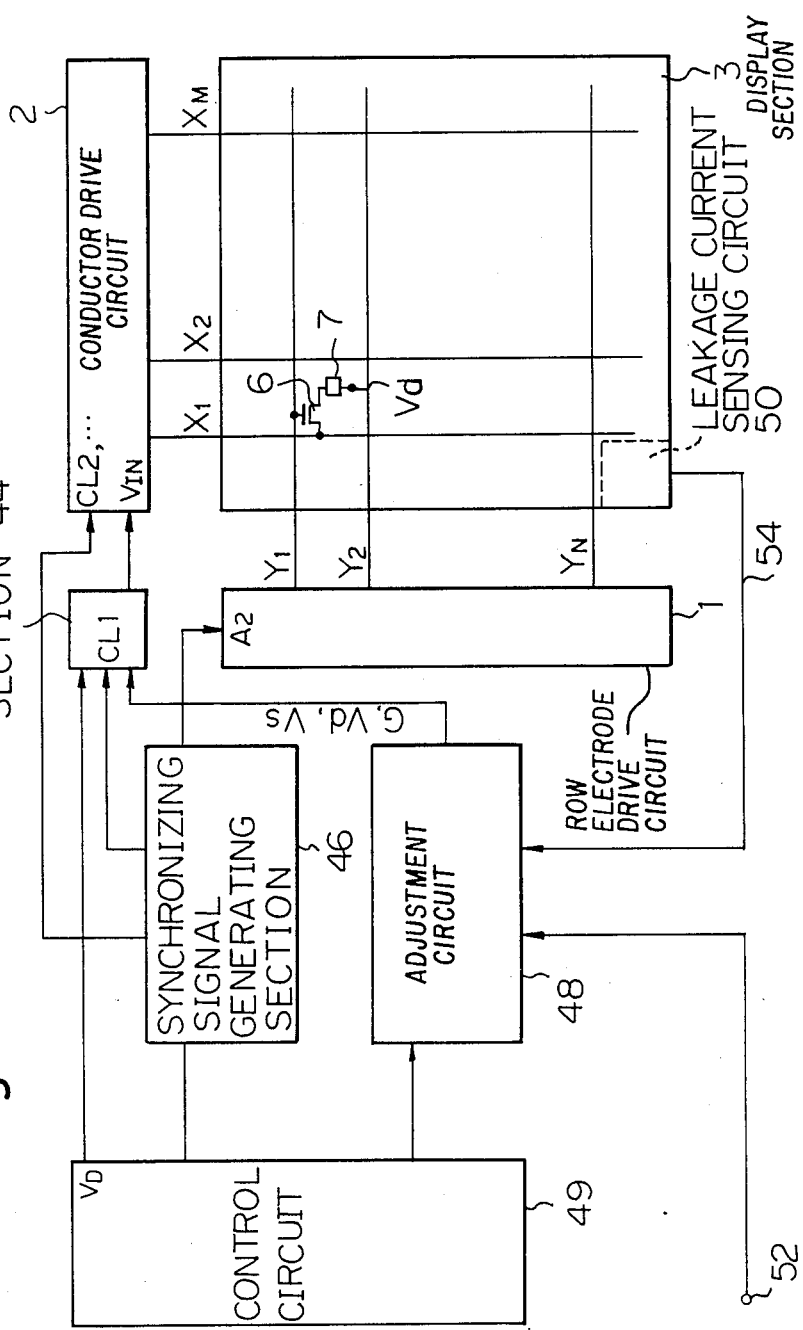
FIG. 5 is a block circuit diagram of an embodiment of a matrix display which employs the drive method of the present invention.

In the embodiment of FIG. 5, a leakage current sensing section 50 is also provided for sensing the level of leakage current of the switching elements (which will vary in accordance with the level of incident light on the display device and other factors), and for applying compensation for this leakage current by appropriately adjusting the amplitude of the video data signal applied to drive the matrix. That is to say, as the level of leakage current increases, then the rate of change of the video data potential stored in a display element (as illustrated by signal Ve in FIG. 10) towards zero will be increased. This can be compensated by increasing the potential stored in the display element during each field, i.e. by increasing the level of the video data signal. In FIG. 5, the leakage current sensing circuit 50 produces an output voltage on a line 54 which varies in accordance with the level of leakage current of the switching elements in display section 3. This voltage is modified by an adjustment circuit 48 by the action of a potential input thereto from a line 52 (which can for example be connected to a presettable potentiometer, to thereby produce a compensation control signal G. This signal G is applied to video signal modulation section 44, and acts to modify the absolute value of the amplitude of the alternating polarity video data signal output from video signal modulation section 44 such as to provide compensation for the current level of leakage current. In this way, even if devices displaying a high level of leakage current in response to incident light are used as the switching elements of the display device, satisfactory operation of the display can be attained.

Figure 6:
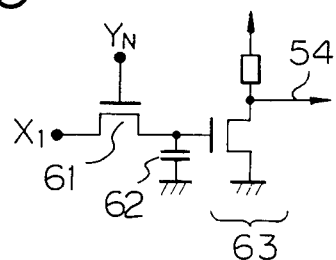
FIG. 6 shows a leakage current sensing circuit.

FIG. 6 shows a simple example of such a leakage current sensing circit 50. This comprises a transistor 61, which can be a typical one of the switching elements used in the display device, coupled to a column conductor X1 and a row conductor Y1 in the same manner as any other switching element. A potential is thereby developed across a storage capacitor 62 which varies in accordance with the level of leakage current of switching element 61, and this potential is applied to the gate electrode of a transistor 63, whereby a corresponding potential is output therefrom on line 54.

Figure 7:
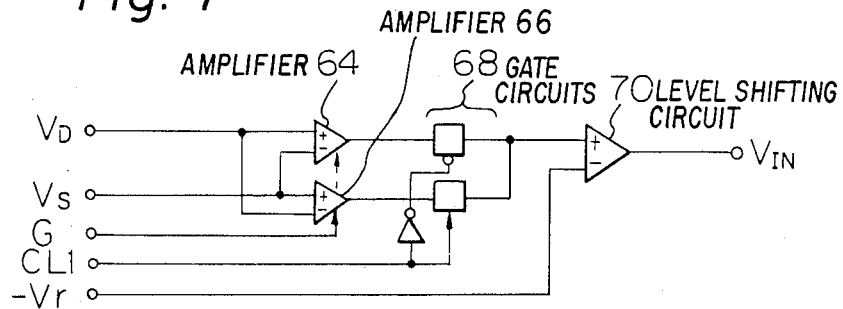
FIG. 7 shows the circuit of a video signal modulation section in the embodiment of FIG. 5.

FIG. 7 shows an example of a circuit for video signal modulation section 44. This comprises gain-controllable amplifier circuits 64 and 66, which serve to vary the amplification of video data signal Vd input thereto in accordance with the compensation control signal G, and also to provide two outputs of opposite polarity with respect to a reference potential Vs as a center value. These outputs are applied to a group of gate circuits 68, which alternately select each of the outputs from amplifiers 64 and 66 on successive horizontal scanning intervals. The resultant output is applied to a level shifting circuit 70, which acts to establish the reference potential Vr as the center value about which the output video data signal Vin will alternately vary in polarity.

It should be noted that this type of compensation, i.e. compensation for leakage current which is applied over the entire display area, is made possible by the drive method of the present invention and cannot be utilized with prior art drive methods. This is because the video data signal, unless it is subjected to alternating polarity processing by the method of the present invention as described above, contains low-frequency components which vary in a completely unpredictable manner.

In the following, the leakage time constant of a display element will be designated as t, where $t = R_L \cdot C_S$, with $R_L$ being the leakage resistance of a switching element and Cs being the data holding capacitance of a display element. If it is assumed that the display is to have 16 density levels, and that the amount of display density error is to be held to withon one density level, then with a prior art drive method it is necessary to make the time constant t have a value of the order of 10 times the charge storage time T (where T is the time for which a video data signal potential must be held stored by a display element, e.g. the duration of a horizontal scanning interval for the case of the examples described above). Thus the holding capacitance Cs must meet the following condition:

$$Cs \geq 10 \cdot T/R_L \text{ (worst)} \tag{1}$$

Since it is difficult to apply leakage current compensation using prior art methods, such as is made possible by the present invention, it is necessary to use in this equation the worst case value for $R_L$, which occurs under conditions of strong illumination of the display device. With the method of the present invention on the other hand, it is not necessary to apply the condition that $t \geq 10T$, since data-dependent leakage current effects are eliminated. It is sufficient to ensure that $t = T$, approximately. Furthermore, if leakage current compensation such as that described above is applied, then satisfactory operation is possible with a value of $T \approx T/10$.

In addition, if such leakage current compensation is utilized, then a value of $R_L$ which meets the requirements of normal operating conditions (i.e. with a low level of light incident on the display device), designated in the following as $R_L$ (normal) can be utilized. In this case the conditions for the value of holding capacitances Cs of each display element can be defined as follows:

$$Cs \geq (0.1 \sim 1) T/R_L \text{ (normal)} \qquad (2)$$

In the case of devices such as amorphous silicon thin-film transistors (abbreviated in the following to a SiTFT) being used as switching elements, then the value of $R_L$ (normal)/$R_L$ (worst) is of the order of 10 to $10^3$. Thus the present invention enables the value of Cs to be made smaller by a factor of the order of $10^{-2}$ to $10^{-4}$ by comparison with prior art drive methods. As a result, if liquid crystal or electrochromism display elements are utilized, then the self-capacitance of each display element will be sufficient for use as a charge holding capacitance, making it unnecessary to provide additional capacitors on the display matrix.

The present invention is not limited to the use of transistors as switching elements, but is also suited to the use of non-linear resistance elements (abbreviated hereinafter to NLREs). An active matrix display device using such NLREs has been described in Japanese patent Nos. 167943 to 167945. As described, use of such elements conveys the advantages of a low drive voltage operating capability, enhanced display area utilization, simple manufacture, high contrast, etc.

Figure 11:
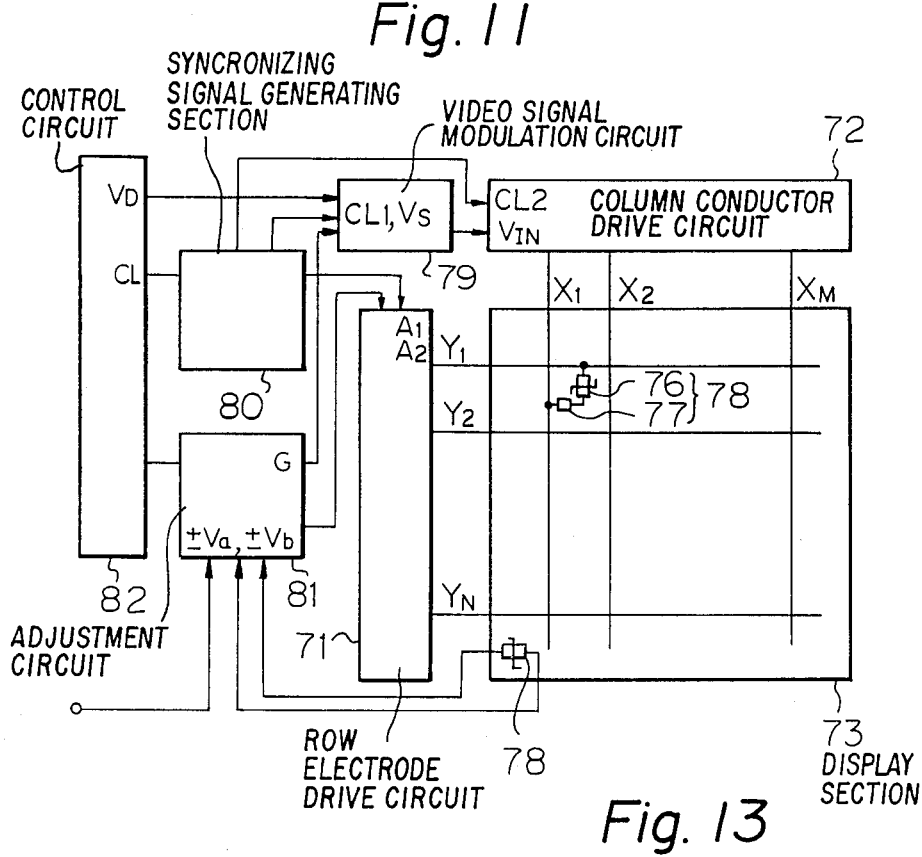
FIG. 11 is a block diagram of another embodiment of the present invention, in which non-linear resistance elements are used as switching elements.

FIG. 11 is a block diagram of an active matrix display device according to the present invention which employs NLRE switching elements. Numeral 73 denotes a display section comprising row conductors Y1 to Yn and column conductors X1 to Xn, and an array of picture elements 78 each comprising a display element 77 and an NLRE 76 connected in series at the intersection of a row conductor and column conductor as shown. In this embodiment, a typical NLRE as denoted by numeral 85 in FIG. 12 comprises a diode ring of the form denoted by numerals 86, 87 or 88.

Figure 12:
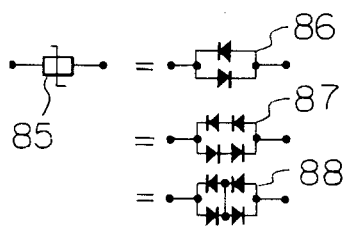
FIGS. 12 and 13 are diagrams for illustrating the characteristics of non-linear resistance elements.
Figure 13:
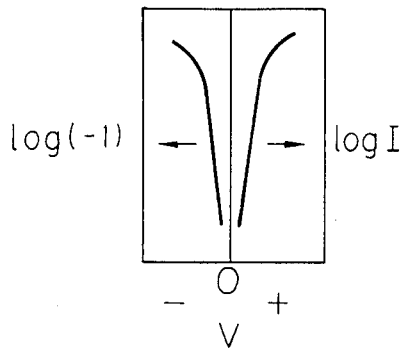

FIG. 13 shows typical current/voltage characteristics for a NLRE of the form shown in FIG. 12. These are symmetrical about the zero volts axis, and vary exponentially in a low voltage region and linearly in a high voltage region.

In FIG. 11, numeral 72 denotes a column conductor drive circuit, 79 denotes a video signal modulation section, 80 denotes a syncronizing signal generating section, 81 denotes an adjustment circuit, and 82 denotes a control circuit. A example of the circuit of video signal modulation section 79 is shown in FIG. 14, and the corresponding drive signal waveforms are shown in FIG. 15. Here, Vd denotes the input video data signal, Vs is a reference potential which is approximately ½ of the amplitude of signal Vd. CL1 is a clock signal which determines the rate of scanning the matrix rows, i.e. with the method of the present invention, the frequency with which inversion of the polarity of the video signal applied to successive rows is performed. The circuit acts to produce an output signal Vd' from the circuit portion comprising amplifiers 96 and 97 and switching gates 91 and 92, comprising the video data signal Vd inverted in polarity once every horizontal scanning interval 1H, with the polarity inversion taking place about the reference potential Vs as a center value. Signal Vd' is then converted to signal Vd output from an amplifier 93, whose gain is controlled by a compensation control signal G generated by leakage current detection circuit means as described above for the previous embodiment.

Numeral 94 denotes a timing pulse generating circuit which successively selects each of the switches in a switch group 95 in accordance with a clock signal CL2, to thereby successively couple the video data signal Vin to the row conductors X1, X2, X3, . . . , with the signals thus selected being stored in a capacitance associated with each column conductor. Signal Xm shown in FIG. 18 illustrates an example of the waveform of one of such sampled-and-held video data signal appearing on a column conductor of this embodiment. In one row scanning signals interval $-Vd$ is the display element OFF level (i.e. the potential applied across a display element for which the display element is set in the non-activated state), and Vd is the ON level, while during the next row scanning signals interval, Vd becomes the OFF level of the display element and $-Vd$ becomes the ON level. In this way, the video data signal Xm can be successively inverted in polarity in successive horizontal scanning intervals 1H.

Figure 16:
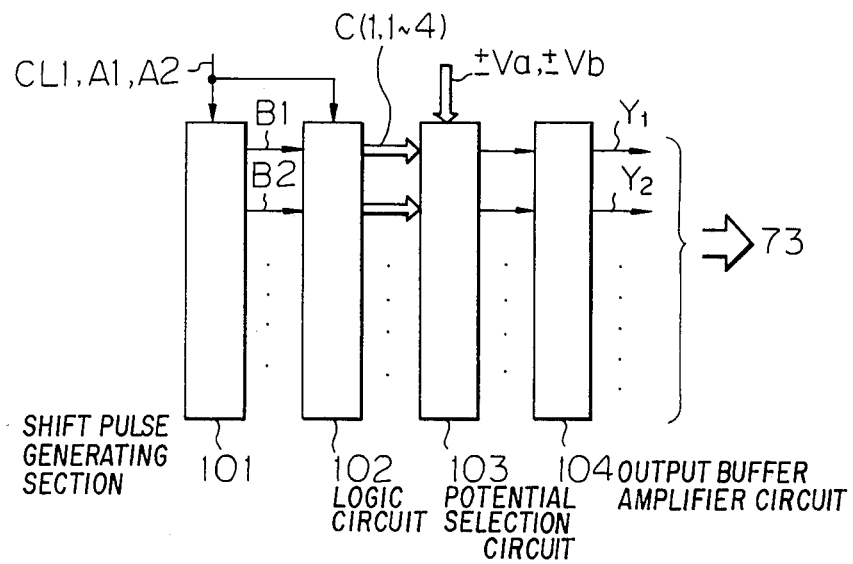
FIGS. 16 and 17 are a block circuit diagram and waveform diagram respectively of a row conductor drive circuit for the embodiment of FIG. 11.
Figure 17:
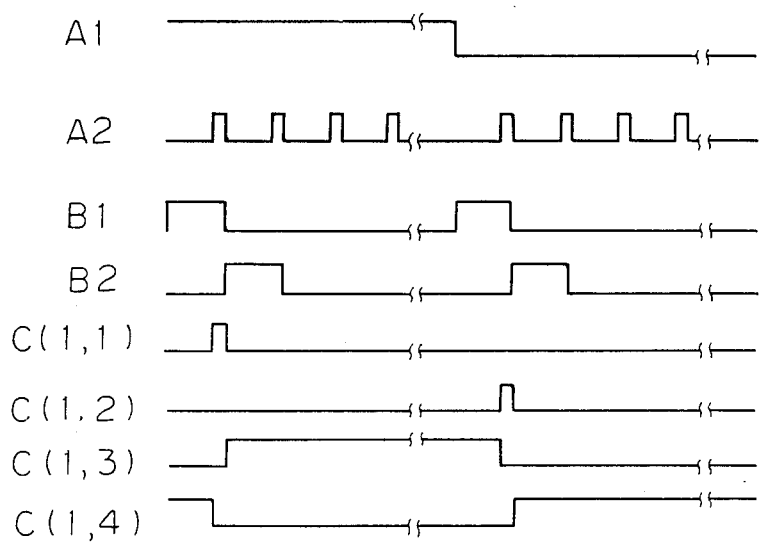

FIG. 16 is a block diagram of the row electrode drive circuit 71 of this embodiment, and FIG. 17 shows the corresponding waveforms. This circuit produces the row scanning signals having the waveforms $Yn-1$, $Yn$, $Yn+1$, . . . shown in FIG. 18. These are inverted in polarity for each successive row of display elements. Numeral 101 denotes a shift pulse generating section, comprising for example a shift register or decoder circuit, which generates signals B1, B2, . . . shown in FIG. 17 in response to clock signals A1 and A2. A logic circuit 102 utilizes clock signals A1, A2, CL1, and B1, B2, . . . to produce pulse signals C(1, 1~4), C(2, 1~4), etc, which are supplied to a potential selection circuit 103. This circuit 103 is supplied with potentials $\pm V_a$, $\pm V_b$, which are selected by signals C(n, 1 4) as illustrated by the $Y_{(n-2)}$ waveform shown in FIG. 18. Numeral 104 denotes an output buffer amplifier circuit, which produces output signals Y1 to Yn to be supplied to the row conductors of the display matrix. Since the video data signal polarity is inverted for odd-numbered and even-numbered rows respectively, it is possible to bring out the set of odd-numbered row electrode connecting leads to one side of the matrix, and to bring out the connecting leads of the even-numbered row conductors to the other side of the matrix. These two sets of connecting leads can thus be coupled to two separate row drive circuits. Such an arrangement will facilitate the connecting lead layout, enabling greater ease of manufacture, particularly in the case of a display device of very small size.

The row scanning signals pulses are a special feature of this embodiment. Considering for example signal Yn in FIG. 18, this can be divided into selection intervals designated as 111 and 112, and non-selection intervals 113, 114, with the potential being $\pm Va$ during intervals 111, 112 and being $\pm Vd$ during intervals 113, 114. During a selection interval, data which has been stored in the capacitances of the column conductors (as illustrated in FIG. 14) is written into all of the display elements in a row. Thus, it is not necessary to provide additional sample-and-hold circuits to hold the video data for each row of display elements during the non-selection intervals 93.

Generally speaking, NLREs do not provide sharply defined changes in the voltage-current characteristic in the region of the threshold voltage, so that such devices do not display satisfactory charge-holding capabilities when conventional drive methods are employed, due to the high leakage current. However with the method of the present invention, since both the ON voltage Von and OFF voltage Voff appearing across each display element will periodically alternate in polarity with respect to the reference potential Vr, compensation for the leakage current effects can be applied by suitably adjusting the amplitude of the video data signal as described hereinabove for the first embodiment. In this case, the leakage current of a NLRE or diode provided on the display matrix can be sensed, to thereby generate a compensation control signal G.

From the above it can be understood that the low frequency components of a video data signal applied to the column conductors of an active matrix display device are removed, and the video data signal modified such as to alternate in polarity about a fixed reference potential level. As described, this enables data-dependent leakage current effects to be eliminated, and further enables compensation to be applied for leakage current effects which affect the entire display matrix uniformly, e.g. such as are caused by incident light upon the matrix.

In the above description it is assumed that the polarity of the video data signal is successively inverted for alternating rows of display elements. However it is equally possible to perform such inversion once for every successive pair of rows of display elements, or once for each of successive numbers of rows, i.e. with a period which is shorter than a scanning field interval, so long as sufficient suppression of data-dependent leakage current effects can be attained. It is equally possible to perform such polarity inversions of the video data signal during intervals which are shorter than a horizontal scanning interval 1H.

Thus, the drive method of the present invention enables the effects of leakage current in switching elements used in active matrix display devices to be effectively eliminated to a high degree, and so enables such display devices to be more easily and economically manufactured, with a higher manufacturing yield, while in addition enabling readily manufactured elements such as NLREs to be used as switching elements in such display devices, in spite of the non-ideal characteristics of such elements.

Although the present invention has been described with respect to specific embodiments, it should be noted that various changes to the described embodiments may be envisaged, which fall within the scope claimed for the present invention as laid out in the appended claims. The above specification should therefore be interpreted in a descriptive and not in a limiting sense.

What is claimed is:

1. A method of driving a matrix display device having a plurality of row conductors, a plurality of column conductors, an array of picture elements disposed at the intersections of said row conductors and column conductors to form a plurality of rows of said picture elements, each of said picture elements comprising a display element including a data holding capacitance and a switching element coupled to said display element and each of said row conductors being coupled to a set of said switching elements of a corresponding one of said rows of picture elements, for controlling switching operation by said switching elements, each of said switching elements developing a leakage current, said matrix display device further having a source of video data signals, column drive means for applying said video data signals to said column conductors, and row drive means for applying scanning signals to said row conductors for sequentially activating said sets of picture elements to store said video data signals from said column conductors into corresponding ones of said display elements, with all of said rows of said array of picture elements being successively scanned during each of sequentially repeated scanning field intervals, whereby the polarity of said video data signals applied to said column conductors is periodically inverted with a repetition interval which is shorter than the duration of said each of sequentially repeated scanning field intervals, and further comprising sensing the level of said leakage current of the switching element provided in said array of picture elements, said sensed leakage current level being representative of said leakage currents developed by said switching elements of said array of picture elements, deriving a control signal in accordance with said sensed leakage current, and applying said control signal to adjust the amplitude of said video data signals applied to said column conductors such as to compensate for the effects of leakage currents of said switching elements upon the operation of said display device.

2. A drive method according to claim 1, in which the polarity of said video data signals applied to said column conductors is sequentially inverted as successive ones of said rows of picture elements are scanned by said row drive means for applying scanning signals.

3. A drive method according to claim 1, in which the polarity of said video data signals applied to said column conductors is sequentially inverted as successive groups of said rows of picture elements are scanned by said row drive means for applying scanning signals.

4. A drive method according to claim 1, in which said switching elements are amorphous silicon thin-film transistors.

5. A drive method according to claim 1, in which said switching elements are non-linear resistance elements.

6. A drive method according to claim 1, in which the polarity of said video data signals applied to each of said picture elements is sequentially inverted during successive ones of said scanning field intervals.

7. A method of driving a matrix display device having a plurality of row conductors, a plurality of column conductors, an array of picture elements disposed at the intersections of said row conductors and column conductors to form a plurality of rows of said picture elements, each of said picture elements comprising a display element including a data holding capacitance and a switching element coupled to said display element and each of said row conductors being coupled to a set of said switching elements of a corresponding one of said rows of picture elements, for controlling switching operation by said switching elements, each of said switching elements developing a leakage current, said matrix display device further having a source of video data signals, column drive means for applying said video data signals to said column conductors, and row drive means for applying scanning signals to said row conductors for sequentially activating said sets of picture elements to store said video data signals from said column conductors into corresponding ones of said display elements, with all of the rows of said array of picture elements being scanned during each of sequentially repeated scanning field intervals, whereby the polarity of said video data signals applied to said column conductors is periodically inverted with a repetition interval which is shorter than the duration of said each of sequentially repeated scanning field intervals, and in which the polarity of said video data signals applied to said column conductors is sequentially inverted as successive ones of said rows of picture elements are scanned by said row drive means for applying scanning signals.

8. A drive method according to claim 7, in which the polarity of said video data signals applied to said column conductors is sequentially inverted as successive groups of said rows of picture elements are scanned by said row drive means for applying scanning signals.

9. A drive method according to claim 7, in which said switching elements are amorphous silicon thin-film transistors.

10. A drive method according to claim 7, in which said switching elements are non-linear resistance elements.

11. A drive method according to claim 7, in which the polarity of said video data signals applied to each of said picture elements is sequentially inverted during successive ones of said scanning field intervals.

12. A method of driving a matrix display device having a plurality of row conductors, a plurality of column conductors, an array of picture elements disposed at the intersections of said row conductors and column conductors to form a plurality of rows of said picture elements, each of said picture elements comprising a display element including a data holding capacitance and a switching element coupled to said display element and each of said row conductors being coupled to a set of said switching elements of a corresponding one of said rows of picture elements, for controlling switching operation by said switching elements, each of said switching elements developing a leakage current, said matrix display device further having a source of video data signals, column drive means for applying said video data signals to said column conductors, and row drive means for applying scanning signals to said row conductors for sequentially activating said sets of picture elements to store said video data signals from said column conductors into corresponding ones of said display elements, with all of the rows of said array of picture elements being scanned during each of sequentially repeated scanning field intervals, whereby the polarity of said video data signals applied to said column conductors is periodically inverted with a repetition interval which is shorter than the duration of said each of sequentially repeated scanning field intervals.

13. A drive method according to claim 12, in which the polarity of said video data signals applied to said column conductors is sequentially inverted as successive ones of said rows of picture elements are scanned by said row drive means for applying scanning signals.

14. A drive method according to claim 12, in which the polarity of said video data signals applied to said column conductors is sequentially inverted as successive groups of said rows of picture elements are scanned by said row drive means for applying scanning signals.

15. A drive method according to claim 12, in which said switching elements are amorphous silicon thin-film transistors.

16. A drive method according to claim 12, in which said switching elements are non-linear resistance elements.

17. A drive method according to claim 12, in which the polarity of said video data signals applied to each of said picture elements is sequentially inverted during successive ones of said scanning field intervals.

* * * * *